E. P. WOODS & D. SHERWOOD.

Egg-Stands and Boilers.

No. 5,269. Reissued Feb. 4, 1873.

Witnesses.

E. H. Johnson

J. P. Cranford

Inventor.

Edward P. Woods

Daniel Sherwood per A. A. Burgess Atty

AM. PHOTO-LITHOGRAPHIC CO. N.Y. (OSBORNE'S PROCESS.)

UNITED STATES PATENT OFFICE.

EDWARD P. WOODS AND DANIEL SHERWOOD, OF LOWELL, MASSACHUSETTS, ASSIGNORS TO THEMSELVES AND CYRUS H. LATHAM.

IMPROVEMENT IN EGG STANDS AND BOILERS.

Specification forming part of Letters Patent No. 70,769, dated November 12, 1867; reissue No. 5,269, dated February 4, 1873.

DIVISION A.

*To all whom it may concern:*

Be it known that we, EDWARD P. WOODS and DANIEL SHERWOOD, of Lowell, in the county of Middlesex and State of Massachusetts, have invented certain new and useful Improvements in the Construction of Wire Stands or Holders, of which the following is a specification:

*Nature and Objects of the Invention.*

Our invention relates to stands or holders made in part of plain and twisted wire, and consists in the production of a new and improved article of manufacture for holding eggs, bottles, &c., as will be fully set forth hereafter.

*Description of the Drawing.*

Similar letters of reference indicate like parts in the drawing.

*General Description.*

Figure 2:
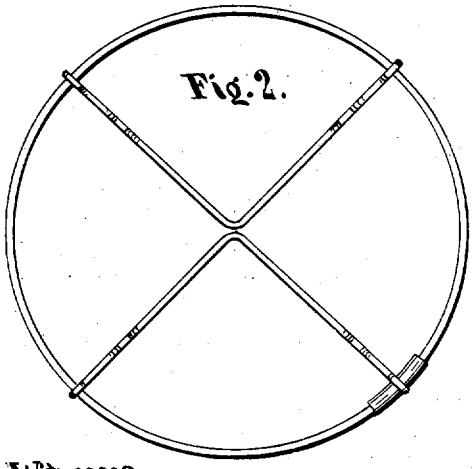
Figs. 2, 3, and 4 show in detail its different parts.
Figure 3:
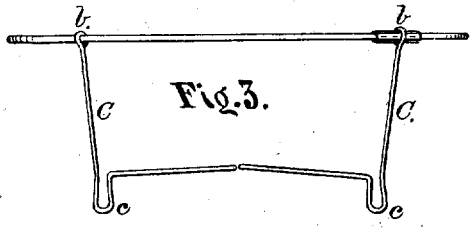
Figure 4:
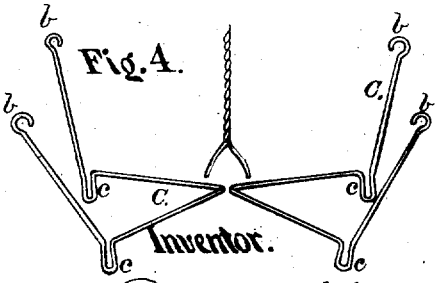

We first make a ring of the desired size and join the ends together, as shown in Figs. 2 and 3, and form parts C C, which, when united, compose the frame. These parts are united together at the center, and are made with eyes *c c*, which form legs for the stand, and with hooks *b b*, to clasp the ring and frame together. The spiral wire *d*, previous to being attached to the frame, is formed on a machine, constructed as follows: A metallic cup-shaped disk is cast of the size desired, and a hole drilled to secure it upon the mandrel, and then finished to its proper shape. This blank is then centered in a lathe, the tool-holder of which is moved by a screw, and on motion being imparted to the holder by proper gearing, a regular spiral groove is cut on the face of the blank, commencing at the center and gradually increasing until the bevel portion is reached. The continuation of the groove on the bevel is cut by a taper-lathe and regular screw-gearing. The groove is cut slightly inclining toward the center, and sufficiently deep to prevent the wire from springing out during the operation of forming up the spiral and fastening the frame thereto.

For a full and more complete description of this machine, reference may be had to the Letters Patent No. 70,770, granted to us, dated November 12, 1867.

Figure 1:
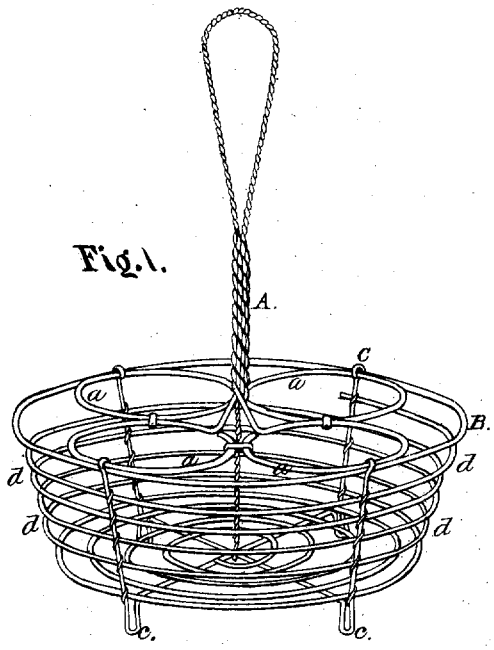
Figure 1 is a perspective view of a stand or holder.

The disk upon which the wire is formed is slotted to conform with the ribs C C of the frame, which will lie directly over said slots when in proper position. After the spiral has been formed the disk is removed from the machine, and the operator places the frame, composed of the ring B and ribs C C, on the disk over the spiral, and connects them together by means of fine wire, interlacing it in and out through the slots, until the whole is firmly secured together. The stand is then removed from the disk, and the handle A and rings *a a* attached thereto. The handle of the stand shown in the drawing is composed of strands of wire twisted together, doubled to form the loop or loops for the handle, and then united by a compound twist above the rings. One of these strands for each holder is then formed into a ring, *a*, and the remaining strands are twisted to form the continuation and to unite the rings and bottom of the stand together, as seen in Fig. 1 of the drawing. When completed they are immersed in a bath of hot metal, and tinned or coated to beautify them and prevent corrosion.

We make these stands with from four to twelve rings, as desired, those of the latter size having two tiers of rings, one above the other.

These stands or holders are used to hold eggs while being boiled, and as an ornamental stand for the table and other domestic uses, and are useful and ornamental in a high degree.

*Claim.*

We claim—

As a new and improved article of manufacture, a wire stand or holder, constructed substantially in the manner described, and for the purposes specified.

EDWARD P. WOODS.
DANIEL SHERWOOD.

Witnesses:
H. F. SLOCUM,
C. H. COOKE.